(12) United States Patent
Barnett et al.

(10) Patent No.: US 7,464,192 B2
(45) Date of Patent: Dec. 9, 2008

(54) PROGRAMMABLE SERIAL INTERFACE FOR A SEMICONDUCTOR CIRCUIT

(75) Inventors: Philip C. Barnett, Clanfield (GB); Andy Green, Northants (GB); Peter C. Van Buskirk, Newtown, CT (US)

(73) Assignee: Silicon Storage Technology, Inc., Sunnyvale, CA (US)

( * ) Notice: Subject to any disclaimer, the term of this patent is extended or adjusted under 35 U.S.C. 154(b) by 262 days.

(21) Appl. No.: 10/238,757

(22) Filed: Sep. 10, 2002

(65) Prior Publication Data

US 2004/0049623 A1  Mar. 11, 2004

(51) Int. Cl.
  *G06F 3/00* (2006.01)
(52) U.S. Cl. .......................... 710/11; 719/327
(58) Field of Classification Search .............. 710/8, 710/10–11, 13–14, 305, 62–63; 709/250, 709/236–237; 719/327
See application file for complete search history.

(56) References Cited

U.S. PATENT DOCUMENTS

| | | | |
|---|---|---|---|
| 4,811,662 A | | 3/1989 | Sterman |
| 5,243,273 A | * | 9/1993 | McAuliffe et al. .......... 714/724 |
| 5,485,590 A | * | 1/1996 | Hyatt et al. ................ 711/115 |
| 5,841,992 A | * | 11/1998 | Martin ....................... 709/250 |
| 6,360,656 B2 | | 3/2002 | Kudo et al. |
| 6,370,603 B1 | * | 4/2002 | Silverman et al. ............. 710/72 |
| 6,446,192 B1 | * | 9/2002 | Narasimhan et al. .......... 712/29 |
| 6,525,678 B1 | * | 2/2003 | Veenstra et al. .............. 341/55 |
| 6,539,438 B1 | * | 3/2003 | Ledzius et al. ................ 710/8 |
| 6,767,097 B2 | | 7/2004 | Streibig |
| 6,984,152 B2 | * | 1/2006 | Mowery et al. .............. 439/638 |
| 2002/0029303 A1 | * | 3/2002 | Nguyen ....................... 709/327 |
| 2003/0125082 A1 | * | 7/2003 | Vanderhelm ................. 455/558 |
| 2004/0089725 A1 | * | 5/2004 | Hill ............................ 235/492 |

OTHER PUBLICATIONS

"EZ-USB® FX™ GPIF Primer," Cypress Semiconductor Corporation (Apr. 29, 2003).
"FTDI Chip: Product Data—Advance Information; FT 2232C 3rd Generation Dual USB UART/FIFO I.C.," (2003).
"Ubicom—Products—IP3000 Family Processors; IP3000 Family," http://www.ubicom.com/products/ip3000/ip/3000.html, downloaded on Mar. 18, 2004.
PCT Search Report mailed on Apr. 5, 2005 corresponding to PCT Patent Application No. US03/28104.

* cited by examiner

*Primary Examiner*—Clifford H Knoll
(74) *Attorney, Agent, or Firm*—DLA Piper LLP (US)

(57) ABSTRACT

A programmable serial interface is disclosed for use in a semiconductor circuit that supports a plurality of communication protocols. The programmable serial interface includes one or more shared hardware components that implement tasks and functions of a plurality of communication protocols, optional protocol specific hardware, a processor and memory. For each task or function required by a supported communication protocol, a determination is made as to which parts of the function will be implemented using shared hardware, protocol specific hardware or in software. The communication protocols to be supported are identified, and the functions performed in accordance with each of the supported protocols are analyzed to identify those functions suitable for common or shared hardware with other communication protocols. In addition, unique or time-critical functions are identified that must be implemented in hardware. Finally, any functions that are not implemented in hardware are implemented in software.

21 Claims, 2 Drawing Sheets ns for maintaining communication, such as specifications for the number of bits-per-word, relative timing and voltage levels. A smart card must incorporate an interface for each of the communication protocols that are supported. Currently, a semiconductor device supporting a number of communication protocols must include a dedicated interface for each supported transmission protocol. Nonetheless, the various communication protocols typically share a number of common functions, such as converting between an incoming serial bit stream and parallel data.

PROGRAMMABLE SERIAL INTERFACE FOR A SEMICONDUCTOR CIRCUIT

FIELD OF THE INVENTION

The present invention relates generally to an interface for transmission protocols on a semiconductor circuits, such as microprocessors and microcontrollers, and more particularly, to a programmable serial interface for supporting a plurality of transmission protocols on such semiconductor circuits.

BACKGROUND OF THE INVENTION

Semiconductor circuits, such as microprocessors and microcontrollers, are often based on a general-purpose microcontroller, such as the Intel 8051, commercially available from Intel Corporation of Santa Clara, Calif. Such general-purpose microcontrollers are typically highly standardized and often support a wide range of commands. In addition, such general-purpose microcontrollers typically have very specific hardware interfaces that are designed for a specific function. While the hardware interfaces may have a degree of flexibility (software control), they are highly constrained in their functionality. For instance, a serial port will be targeted almost exclusively to a specific standard interface. A hardware solution for a RS232 serial interface, for example, requires a different design than a hardware solution for a Universal Serial Bus (USB) interface. Thus, when a semiconductor circuit is designed for a specialized purpose, such as a smart card, a majority of the interface is in hardware and many of the commands supported by the underlying microcontroller are not utilized. Thus, the semiconductor circuit has a larger surface area than necessary and is otherwise an inefficient use of the microcontroller.

The development of semiconductor circuits is often an expensive and time-consuming process. In addition, with a trend towards specialized smart cards for each customer and application, the specific configuration of a smart card will depend on the ultimate application. Thus, the design and development of a specific smart card and application typically involves an identification of the target market, followed by the design and manufacture of a specific integrated circuit. For more sophisticated applications, such as a smart card used for access control applications, the smart card will have more sophisticated and complicated integrated circuits, and will typically include various volatile and non-volatile memory technologies that are typically loaded with application-specific software at the time of manufacture.

Since the market for a given smart card application may be at an early stage of development, it may be difficult to rationalize development of highly specialized smart card chips for a market that may or may not grow rapidly, and which is poorly understood. Furthermore, the requirement for increasingly complex and secure integrated circuits for many smart card applications extends the design cycle, which in turn increases the cost of the device produced. This is at odds with the requirements of the smart card industry for low cost and rapid fabrication.

The early identification of the specific requirements for a given smart card during the initial design stage is further complicated by the absence of standards. As the smart card industry has developed, a number of communication protocols, operating systems and security schemes have been employed. For example, various communication protocols are used in smart card applications, such as the ISO7816, USB and a number of Radio Frequency Identification Device (RFID) standards, each having their own unique require- A need therefore exists for a semiconductor circuit that supports a number of communication protocols without requiring a dedicated hardware implementation for each protocol. A further need exists for a programmable serial interface that allows various hardware elements to be shared by a number of supported communication protocols. Yet another need exists for a configurable serial interface that may be reconfigured to operate in accordance with a selected communication protocol. In addition, a need exists for a programmable serial interface that implements one or more functions in software instead of dedicated hardware.

SUMMARY OF THE INVENTION

Generally, a programmable serial interface is disclosed for use in a semiconductor circuit that supports a plurality of communication protocols. The programmable serial interface includes one or more shared hardware components that implement tasks and functions of a plurality of communication protocols, optional protocol specific hardware, a processor and memory. For each task or function required by a supported communication protocol, a determination is made as to which parts of the function will be implemented using shared hardware, protocol specific hardware or in software.

During a design phase, the communication protocols to be supported by the semiconductor circuit are identified, and the functions performed in accordance with each of the supported protocols are analyzed to identify those functions suitable for common or shared hardware with other communication protocols. In addition, unique or time-critical functions are identified that must be implemented in hardware. Finally, any functions that are not implemented in hardware are implemented in software.

A more complete understanding of the present invention, as well as further features and advantages of the present invention, will be obtained by reference to the following detailed description and drawings.

DETAILED DESCRIPTION

Figure 1:
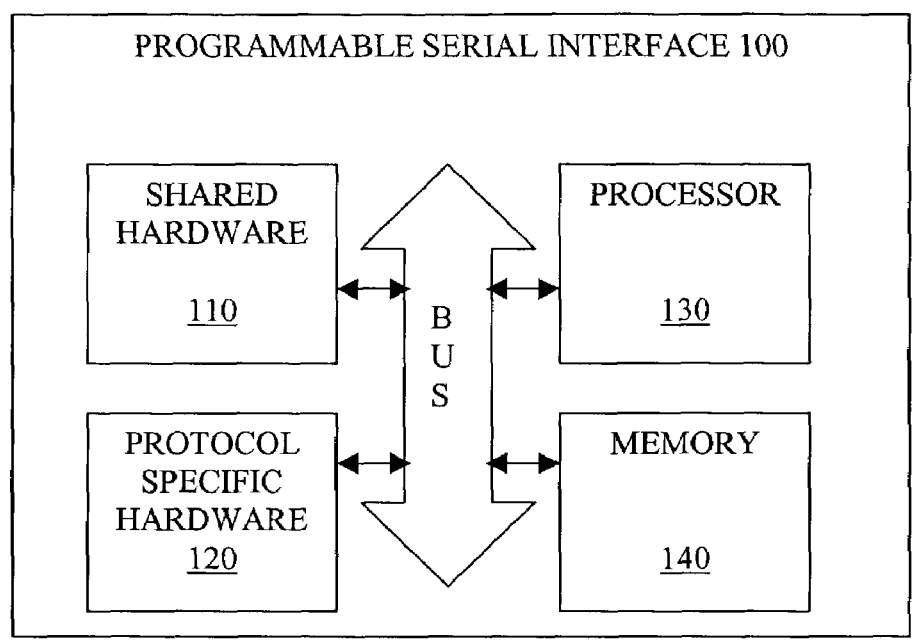
FIG. 1 is a block diagram illustrating a programmable serial interface for use in a semiconductor circuit in accordance with the present invention.

FIG. 1 is a block diagram of a programmable serial interface 100 for use in a semiconductor circuit that supports a plurality of communication protocols in accordance with the present invention. The present invention recognizes that many serial communication protocols have a number of similarities that can be exploited to make a single interface capable of interfacing to a number of protocols.

Implementation of Protocol Functions in Hardware or Software

According to one aspect of the invention, the programmable serial interface 100 includes one or more shared hardware components that implement tasks and functions of a plurality of communication protocols. Generally, the functions associated with the communication protocols that are implemented in hardware must be balanced with the burden on the processor to implement the remaining functions in software. Thus, when a semiconductor circuit is initially designed in accordance with the present invention, the communication protocols to be supported by the semiconductor circuit are identified, and the functions performed in accordance with each of the supported protocols are analyzed to identify those functions suitable for common or shared hardware with other communication protocols. This shared hardware is configurable under software control to accommodate variations of the protocol requirements.

In addition, some communication protocols may have unique demands or certain time-critical functions that must be implemented in hardware, even if the hardware is not shared with other communication protocols. Most protocols have operations that occur faster than the permissible processor timescale. For example, while a number of protocols may be too demanding at the bit level for a software implementation, they may have a larger granularity structure for which a reasonably fast processor may be adequate once a serial-to-parallel conversion has been performed. Thus, for such communication protocols, the conversion of the incoming serial bit stream to parallel data is performed in hardware before the parallelized data is passed to the processor. The invention maximizes the reuse of time-critical functions implemented in shared hardware and minimizes specialized or dedicated hardware for a particular communication protocol. Even when a communication protocol has unique demands that must be implemented using dedicated hardware, portions of the hardware can be reused for other tasks. For example, fractional frequency sine and cosine generators needed for one task can be reused in radio frequency reception and transmission.

Finally, the functions that are not implemented in hardware in accordance with the present invention are implemented in software. Thus, for each function or task required for a given supported communication protocol, the designer must determine which parts of the function will be implemented using shared hardware, protocol specific hardware or in software.

As discussed further below, the programmable serial interface 100 may optionally include one or more reconfigurable hardware elements to allow the semiconductor circuit to support unanticipated or future developed communication protocols. While a reconfigurable hardware implementation does provide added flexibility to support additional communication protocols, security constraints for a given application may require that the semiconductor circuit be fixed upon manufacture.

Thus, as shown in FIG. 1, a programmable serial interface 100 in accordance with the present invention includes shared hardware 110 that performs functions for a plurality of communication protocols, optional protocol specific hardware 120, a processor 130 and memory 140. The memory 140 and/or a read only memory (ROM) are operable to store one or more instructions, which the processor 130 is operable to retrieve, interpret and execute. Generally, the overhead for such flexible logic is offset by the savings achieved by using one semiconductor circuit in many applications.

Figure 2:
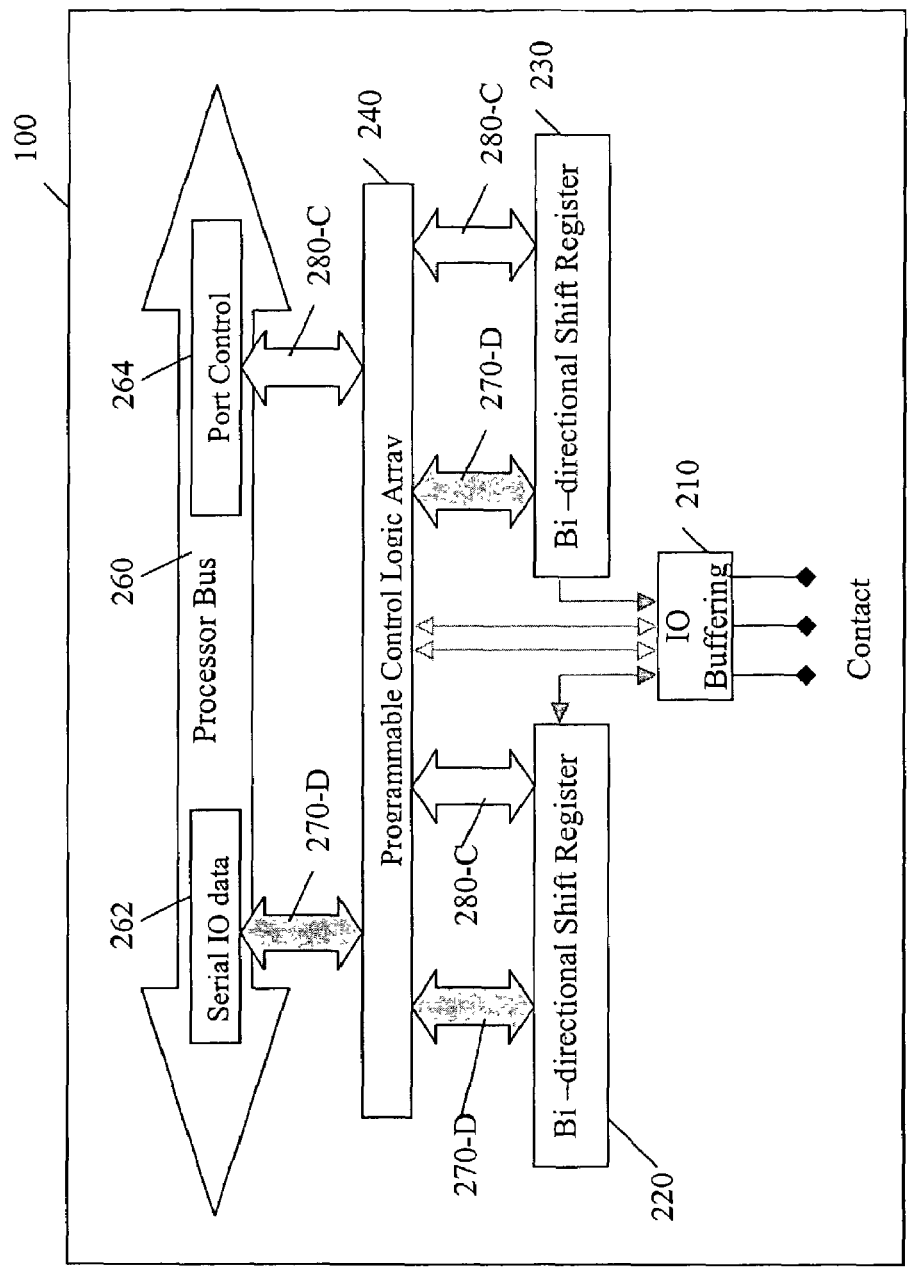
FIG. 2 illustrates an embodiment of the programmable serial interface of FIG. 1 in further detail.

FIG. 2 illustrates an embodiment of the programmable serial interface 100 of FIG. 1 in further detail. As shown in FIG. 2, the exemplary programmable serial interface 100 includes an input/output buffer 210, a pair of bi-directional shift registers 220, 230, a programmable control logic array 240 and a processor bus 260. The processor bus 260 transfers serial input/output data 262 and serial port control signals 264 between the processor 130 and the various elements of the programmable serial interface 100, shown in FIG. 1, using a data flow path 270-D and a control channel 280-C, as appropriate.

The input/output buffer 210 (i) provides the electrical connection and interface to external devices, (ii) controls the direction of the input/output pins and (iii) translates voltage levels, in accordance with the requirements of the selected protocol. The bi-directional shift registers 220, 230 perform a parallel-to-serial (or vice versa) function in a known manner. There are two bi-directional shift registers 220, 230 in the exemplary embodiment to permit simultaneous dual half and one full duplex communications.

The programmable control logic array 240 may include additional shared or specialized hardware to support the functions of one or more communication protocols, such as the functions described below in the section entitled "Handling of Exemplary Protocol Functions." The programmable control logic array 240 may be embodied, for example, as a field programmable gate array (FPGA). As previously indicated, the programmable control logic array 240 may include configurable hardware under software control to accommodate variations of the protocol requirements. The programmable control logic array 240 is loaded with the configuration data for a given communication protocol using the control channel 280-C, to make the logic within the programmable control logic array 240 behave like an interface that conforms to the selected protocol, such as the ISO7816 specification. In this manner, once configured, the programmable control logic array 240 operates to implement the selected communication protocol. The reconfigurability of the programmable control logic array 240 also allows the semiconductor circuit to support unanticipated or future developed communication protocols.

Thus, various hardware elements in the programmable serial interface 100 are programmed in accordance with the present invention to select the function(s) required for a given protocol. For example, the bi-directional shift registers 220, 230 may be configured using appropriate commands on the control channel 280-C to set, for example, the direction, number of shifts per incoming bit stream and shift rate for the selected protocol.

Handling of Exemplary Protocol Functions

Input/Output Functions

The input/output requirements for many protocols involve single ended and differential transceivers. Often, the differential transmitters are required to have matched P and N transistors with very similar "on" resistances, which can be implemented on two pins that can be used independently (with the feature of extra-good '1' drive) or as a differential pair. In some protocols, the transmission and reception share the same lines in a half-duplex manner. This further requires that the differential transmitter is capable of going into a high-impedance state.

It is not enough, however, to use two normal input pins as a differential receiver. This would not exhibit the characteristic common-mode rejection that a genuine differential receiver provides. A separate genuine differential receiver is necessary, although it may share pins with a pair of normal input pins, provided the protection circuitry of the pin allows high common mode voltage without clamping.

Clocks

Clock coding and recovery is a preoccupation of many of the serial protocols by their nature. Clocks are either provided explicitly with their own signal external to the device, from an internal clock source, or are coded into the received data. For recovery, there are only a small number of clock coding schemes possible. Thus, the programmable serial interface 100 can be designed to perform decoding for such desired clock coding schemes.

For transmission clocks, there is not necessarily any relation between the system clock rate and the clock rate required by the programmable serial interface 100 for a particular protocol emulation, so it may be necessary to have available a separate transmit clock input pin.

Some protocols allow full duplex communications, i.e., simultaneous transmission and reception. In order to support protocols allowing full duplex communications, the programmable serial interface 100 should include separate shifters for transmit and receive traffic.

Jitter

When software is responsible for computing the next action, there is the likelihood of jitter being introduced. For some protocols, jitter cannot be tolerated as they have very tight tolerances for timing jitter. Thus, to minimize jitter, the software can pre-compute the next action and store the result in a hardware buffer with a depth of at least one unit, byte word or block. The hardware then moves to this next state at exactly the right moment, thereby hiding the unavoidable processor jitter.

Furthermore, many protocols have hard real time update requirements that will not tolerate any jitter caused by the processor being late in servicing a request because it is loaded down with other tasks. Thus, there will be some degree of hardware data buffering so that the hardware has some reserves of data to draw on while the processor is not able to service the programmable serial interface 100.

A related problem occurs when a processor must service more than one programmable serial interface 100 simultaneously, potentially causing one or more programmable serial interfaces 100 to under run. This will be the case if two half duplex protocols are operating simultaneously, with one protocol being serviced by register 220 and its associated circuitry and the other protocol being serviced by register 230. By definition, in this example, the processing bandwidth of two half duplex channels is the same as one full duplex channel and the load placed on the processing element remains the same. In one implementation, a failure from multiple service requests is avoided by time-slicing the processor. Hardware time-slicing involves making every state that forms the processor context (Program Counter, flags, Accumulator) into an array of states. In other words, instead of having a single Program Counter and Accumulator, there are now n of them. In the degenerate case, this system functions like a normal processor with n equal to one (n=1). However, when n is 2 or more, the processor acts like two half-speed processors by alternating which set of Program Counter and Accumulators are in use on that clock cycle. There is no time penalty for performing the execution in a different context.

Under a time-slicing scheme, each active programmable serial interface 100 associates itself to a unique execution context. A hardware scheduler ensures that each of the active contexts is given one clock of execution in turn. So, when no programmable serial interface 100 needs service, the scheduler gives all the CPU time to the default execution context for user code. When a programmable serial interface 100 needs service, the clocks are instead given to the execution context belonging to the programmable serial interface 100 that needs attention. And when multiple programmable serial interfaces 100 need service, the clocks are shared between the execution contexts belonging to the programmable serial interfaces 100 that need attention on a clock-by-clock distribution.

Shift Registers and Counters

As discussed above in conjunction with FIG. 2, the programmable serial interface 100 includes a pair of bi-directional shift registers 220, 230. Generally, one of the bi-directional shift register 220, 230 can be used for transmitting data while the other bi-directional shift register 220, 230 can simultaneously receive data. The transmit shift register 220 is fed via the buffer register 210 which is generally the same width as the shift register 220. The depth of the buffer register 210 can be one or more. Thus, the buffer register 210 can be embodied as a first-in-first-out (FIFO) buffer. For continuous transmission, it is the aim of the service software to minimize the time that the buffer register 210 is empty. Thus, as soon as the buffer register 210 contents are loaded into the shift register 220, the programmable serial interface 100 signals that it needs service.

Counters associated with the shift register 220 track the number of bits left available for issue or the number of bits left for reception.

CRC Generation and Checking

Many protocols protect their data integrity in transit by appending check bits. In more simple systems, the check bits are parity bits. In more complex protocols, the check bits can be cyclic redundancy checks (CRCs) or checksums to the packets being sent. It is the responsibility of the sender to add them and of the receiver to check that they match the received data payload. Because these checksums are often computed on a per-bit basis, it is not always possible to compute them in software in the time needed by the particular protocol. This often mandates CRC management hardware in the transmit and receive sections. Because the length and polynomial pattern of the CRC will be different for different protocols, these must be configured by software.

Bit Stuffing

Some transmission clock coding schemes do not allow there to be a run of bits where no transitions are issued on the transmission medium. The receiver includes a phase locked loop (PLL) or digital PLLs free running to recover the clock. Therefore, the protocols must take care that too long a period does not pass without a transition that allows the receive clock to maintain phase synchronization with the transmit clock. For this reason, many protocols, including USB and ISDN, specify that a transition must be inserted into the transmission when there is a run of bits without a transition. The receiving end knows this rule too, and after seeing the specified number of bits, the receiver knows to delete the next bit as it must be a "stuffed" bit.

Again, this action cannot be implemented in software since the stuffed bits do not feature in the CRC computation. In addition, there may not be enough time to extract received stuffed bits in software. So, there must be bit stuffing hardware element included if a supported protocol employs bit stuffing.

It is to be understood that the embodiments and variations shown and described herein are merely illustrative of the principles of this invention and that various modifications may be implemented by those skilled in the art without departing from the scope and spirit of the invention.

We claim:

1. A smart card programmable serial interface for use in a semiconductor circuit that supports a plurality of protocols, the serial interface comprising:
   an input/output buffer for use in a smart card and for providing serial communication between the semiconductor circuit and an external device using at least one of the plurality of protocols, the input/output buffer including an electrical connection for coupling to said external device, the input/output buffer being configurable to provide, on the electrical connection, signals having electrical characteristics of each protocol of the plurality of protocols;
   at least one shared hardware element for use in the smart card and coupled to the input/output buffer, the shared hardware element performing a common task for said plurality of protocols; and
   a programmable logic array for use in the smart card and coupled to the input/output buffer, the programmable logic array implementing one or more additional tasks for said plurality of protocols;
   wherein said smart card programmable serial interface is reconfigurable by software to support each protocol of said plurality of protocols.

2. The programmable serial interface of claim 1, wherein said programmable logic array is reconfigurable.

3. The programmable serial interface of claim 1, wherein said at least one shared hardware element is reconfigurable.

4. The programmable serial interface of claim 1, wherein said common task is a serial-to-parallel conversion.

5. The programmable serial interface of claim 1, wherein said common task is a parallel-to-serial conversion.

6. The programmable serial interface of claim 1, wherein the semiconductor circuit comprises integrated circuitry logically arranged to implement hardware components that are one or both of shared by the plurality of protocols and/or required for protocol-specific functionality.

7. The programmable serial interface of claim 1, wherein said common task is a clock recovery function.

8. The programmable serial interface of claim 1, wherein said additional task is a bit stuffing function.

9. The programmable serial interface of claim 1, wherein said programmable logic array is a field programmable gate array.

10. The programmable serial interface of claim 1, wherein said programmable logic array is an electrical programmable logic device (EPLD).

11. A method for designing a smart card semiconductor circuit, said method comprising the steps of:
    in a semiconductor circuit for use in a smart card, identifying a plurality of communication protocols to be supported by said semiconductor circuit;
    analyzing functions required by each of said supported communication protocols to identify those functions suitable for an implementation using shared hardware with other communication protocols;
    designing an input/output buffer for use in a smart card for providing serial communication between the semiconductor circuit and an external device using at least one of the plurality of protocols, the input/output buffer including an electrical connection for coupling to said external device, the input/output buffer being configurable to provide, on the electrical connection, signals having electrical characteristics of each protocol of the plurality of protocols; and
    designing a shared hardware element for use in the smart card and coupled to the input/output buffer, the shared hardware element performing a common task for said plurality of communication protocols;
    wherein said semiconductor circuit is reconfigurable by software to support each protocol of said plurality of communication protocols.

12. The method of claim 11, further comprising the step of identifying functions required by a supported communication protocol that must be performed in hardware.

13. The method of claim 12, wherein said hardware is a programmable logic array.

14. The method of claim 13, wherein said programmable logic array is reconfigurable.

15. The method of claim 13, wherein said programmable logic array is a field programmable gate array.

16. The method of claim 13, wherein said programmable logic array is an electrical programmable logic device (EPLD).

17. The method of claim 11, further comprising the step of implementing at least a portion of the functions required by a supported communication protocol in software.

18. The method of claim 11, wherein said shared hardware element is reconfigurable.

19. A system for designing a smart card semiconductor circuit, said system comprising:
    a memory that stores computer-readable code; and
    a processor operatively coupled to said memory, said processor configured to implement said computer-readable code, said computer-readable code configured to:
    identify a plurality of communication protocols to be supported by said semiconductor circuit;
    analyze functions required by each of said supported communication protocols to identify those functions suitable for an implementation using shared hardware with other communication protocols;
    design an input/output buffer for use in a smart card for providing serial communication between the semiconductor circuit and an external device using at least one of the plurality of protocols, the input/output buffer including an electrical connection for coupling to said external device, the input/output buffer being configurable to provide, on the electrical connection, signals having electrical characteristics of each protocol of the plurality of protocols; and
    design a shared hardware element for use in the smart card and coupled to the input/output buffer, the shared hardware element performing a common task for said plurality of communication protocols;
    wherein said smart card semiconductor circuit is reconfigurable by software to support each protocol of said plurality of communication protocols.

20. The system of claim 19, wherein said processor is further configured to identify functions required by a supported communication protocol that must be performed in hardware.

21. The system of claim 19, wherein said processor is further configured to identify functions required by a supported communication protocol to be performed in software.

* * * * *